United States Patent [19]

Noguchi et al.

[11] 4,265,022
[45] May 5, 1981

[54] CONTOUR MEASURING APPARATUS

[75] Inventors: Hironori Noguchi; Kenji Sakuma, both of Kawasaki, Japan

[73] Assignee: M. T. I. Corporation, Paramus, N.J.

[21] Appl. No.: 13,965

[22] Filed: Feb. 22, 1979

[51] Int. Cl.³ .............................................. G01B 7/28
[52] U.S. Cl. ................................. 33/174 P; 33/174 L; 33/149 J
[58] Field of Search .............. 33/174 P, 174 L, 174 R, 33/149 J, 148 H, 172 E, 169 R

[56] References Cited

U.S. PATENT DOCUMENTS

| 3,319,341 | 5/1967 | Graham | 33/174 P |
| 3,785,056 | 1/1974 | Schiler | 33/174 L |
| 4,074,438 | 2/1978 | Takeda | 33/174 L |
| 4,141,148 | 2/1979 | Noguchi | 33/174 L |

FOREIGN PATENT DOCUMENTS 1498009 1/1978 United Kingdom .................. 33/174 L Primary Examiner—Willis Little
Attorney, Agent, or Firm—Koda and Androlia

[57] ABSTRACT

A measuring device for measuring the contour of an object is disclosed. The device comprises a measuring arm having a first center of gravity adjacent at one end thereof, a second center of gravity adjacent the other end thereof and a fulcrum therein between. The arm is configured such that the first and second centers of gravity and the fulcrum lie in a common line.

17 Claims, 13 Drawing Figures

CONTOUR MEASURING APPARATUS

BACKGROUND OF THE INVENTION

1. Field of the Invention

This invention relates to a measuring device for measuring the configuration of an object, and more particularly, to a measuring device with a stylus movable along an object so as to measure its configuration.

2. Prior Art

It is well known in the prior art to use a measuring device for measuring the configuration of an object. Such a device has a stylus movable along the object as is generally shown in U.S. Pat. No. 3,319,341. The prior art device has a stylus at one end of a rotatable arm with a weight mounted at the other end of the arm such that the weight keeps the balance so as to maintain the stylus in touching relationship with the object as the stylus moves smooth relative to the object. Thus, the prior art device measures the configuration of the object through the movement of the stylus.

Figure 1:
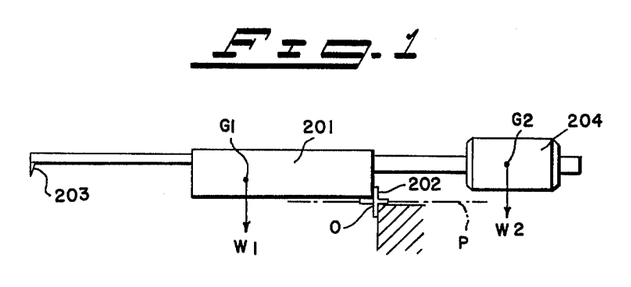
FIG. 1 is a plan view showing the basic structure of a prior art device.

Referring to FIG. 1, there is shown the basic structure of a stylus arm of the prior art. The arm 201 is rotatably held by a cross spring 202 midway along arm 201. Arm 201 is further provided with a stylus 203 at one end and an adjustable weight 204 at the other end. In this device, usually the center of the gravity G1 on the stylus side which is represented by weight W1 of the arm 201 from the fulcrum 0 to the end and the center of the gravity G2 on the weight side represented by the weight W2 of the arm 201 from the fulcrum 0 to the other end are both higher than the horizontal line P which runs across fulcrum 0. In other words, the lines connected between the fulcrum 0 and the center of gravity G1 and the other center of gravity G2 do not form a straight line; rather, form a V-shape line. It has been found that such device results in undesirable requirements in a force necessary to be used on a stylus when the device is used.

Figure 2A:
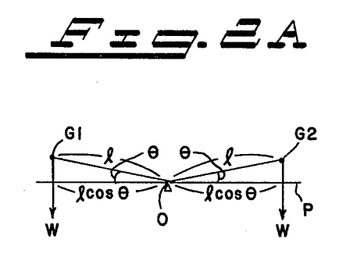
FIGS. 2A and B is a representation of the angles formed between the various elements of the prior art device.
Figure 2B:
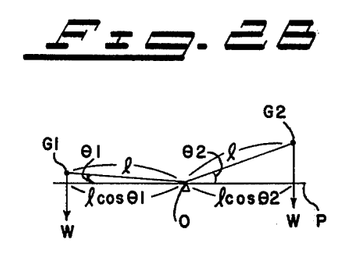

Referring now to FIGS. 2(A) and 2(B) one can see in illustration of the drawback of such prior art device in terms of the difference in the force on the stylus. To simplify this explanation, weights are loaded at the center of gravity G1 and G2 and are assumed to be the same. These weights are referred to in the drawings in FIG. 2 as W and the distance from the fulcrum 0 to the center of gravity G1 and to the center of gravity G2 are assumed to be the same and indicated as length l.

Shown in FIG. 2(A), when the arm is kept horizontal, the angle formed by the line between the center of gravity G1 and the fulcrum 0 and the horizontal line P, and the angle formed by the line between the center of gravity G2 and the fulcrum 0 is indicated by $\theta$; further, the moment about the fulcrum 0 at the center of gravity G1 and G2 when balance can be represented by the formula $W \cdot l \cos \theta$.

As shown in FIG. 2(B), when the left side of the arm is disposed downward, angle formed by the line between the center of gravity G1 and the fulcrum 0, and the horizontal line P is $\theta$. The angle formed by the lines between the center of gravity G2 and the fulcrum 0, and the horizontal line P is $\theta_2$. The moment at the center of gravity G1 is therefore represented by the formula $W \cdot l \cos \theta_1$, and the moment at the center of gravity G2 is represented by the formula $W \cdot l \cos \theta_2$. Since the angles $\theta$, $\theta_1$, and $\theta_2$ have a relation to one another as follows: $\theta_1 < \theta < \theta_2$, there exists a relationship as follows: $l \cos \theta_1 > l \cos \theta > l \cos \theta_2$. Therefore, the moment the center of graviry G1 and G2 have a relationship represented as follows: $W \cdot l \cos \theta_1 > W \cdot l \cos \theta_2$. As a result, the imbalance cause creates a counter-clockwise moment. This means that the stylus receives an additional measuring force which has been found to be a significant disadvantage in connection with measuring the configuration of an object.

In the above explanation although it is assumed that the moment at the center of gravity G1 is the same as the moment at the center of gravity G2, it has been found that in actual device, the moment at the center of gravity G1 is designed so as to be slightly greater than the other i.e., G2 such that the stylus receives some measuring force. However, there are still shortcomings associated with such a stylus. Further, in such a case the device can lean on the other direction when the measuring force that the stylus receives is decreased. In either situation, the measuring force is not stable. This has been found to be true regardless of the angles formed and the distance between the fulcrum 0 and the center of gravity G1 and G2 or the position of the centers of gravity G1 and G2 either being above or below the fulcrum 0.

In summary, in the prior art device no attention was paid to the relationship between the fulcrum 0 and the centers of gravity G1 and G2. Therefore, it has been found that the measuring thus obtained includes somewhat inaccurate information unless the device is used so as to keep the device in a strictly horizontal position. This can substantially limit the use of device and thus represents a shortcoming.

It is therefore, an object of this invention to provide a measuring device which keeps the constant force on the stylus even when the device is being used such that the arm is bending forward and backward.

BRIEF DESCRIPTION OF THE INVENTION

The present invention is directed to a measuring device for measuring the configuration of an object and which substantially overcomes the problems associated with prior art devices. In the measuring device of the present invention, the center of gravity in the arm from the fulcrum to the end toward the stylus and the other center of gravity in the arm from the fulcrum to the other end of the arm toward the weight are so arranged that the line between the center of gravity lies in horizontal plan substantially across the fulcrum.

Figure 3A:
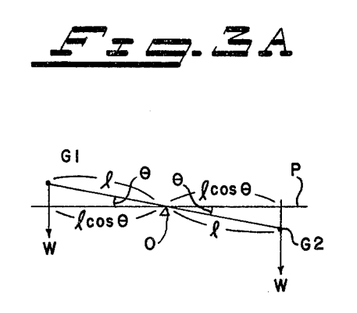
FIG. 3 is a representation of the angles formed between the various elements of the device of the present invention.

Referring now to FIGS. 3(A) and (B) there is shown the general principle of the present invention. In such Figures, like reference numerals denote like elements. As shown in FIG. 3(A), the line connected between the centers of gravity G1 and G2 lie directly across the fulcrum 0. Further, the distances between the fulcrum 0 and the centers of gravity G1 and G2 are equal to l. Thus, the angles formed by and between the fulcrum 0, and the centers of gravity G1 and G2 and the horizontal line P are equal to $\theta$. The moments at the centers of garvity G1 and G2 are therefore, equal to $W \cdot l \cos \theta$.

Figure 3B:
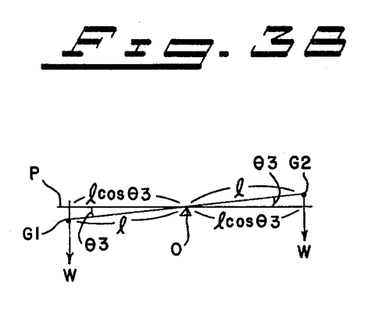

FIG. 3(B) shows the situation where the angles formed by and between fulcrum 0 and the centers of gravity G1 and G2, and the horizontal line P are equal to $\theta_3$. Since the line connecting the centers of gravity G1 and G2 and the fulcrum 0 is straight, the moments at the centers of gravity G1 and G2 are both equal to $W \cdot l \cos \theta_3$. In the actual device of the present invention, the moment at the center of gravity G1 is so arranged as to be slightly more than the moment at the center of gravity G2 such that the stylus receives some measuring force. By arranging the centers of gravity G1 and G2 to have an imaginary line thereinbetween substantially across the fulcrum 0, it is possible to obtain a stable and precise measuring force on the stylus.

Reference is now made to the Figures into a detailed description of the invention. It is to be understood, however, that the Figures and the detailed description of the invention are purposes of illustration only and are not intended to be limits of the invention.

BRIEF DESCRIPTION OF THE DRAWINGS

FIG. 8 is a sectional view of the main body of the measuring device of the present invention.

DETAILED DESCRIPTION OF THE INVENTION

At base 1 is shown formed with a "T" shaped groove 2 for mounting therein an object to be measured (not shown) and has a guide 3 for positioning the object to be measured. The base 1 is provided at one side surface thereof with an instrument panel 4 and also at the undersurface thereof with an electric circuit 5 connected to the instrument panel 4. Leading out of the electric circuit 5 is a cable 6.

Figure 5:
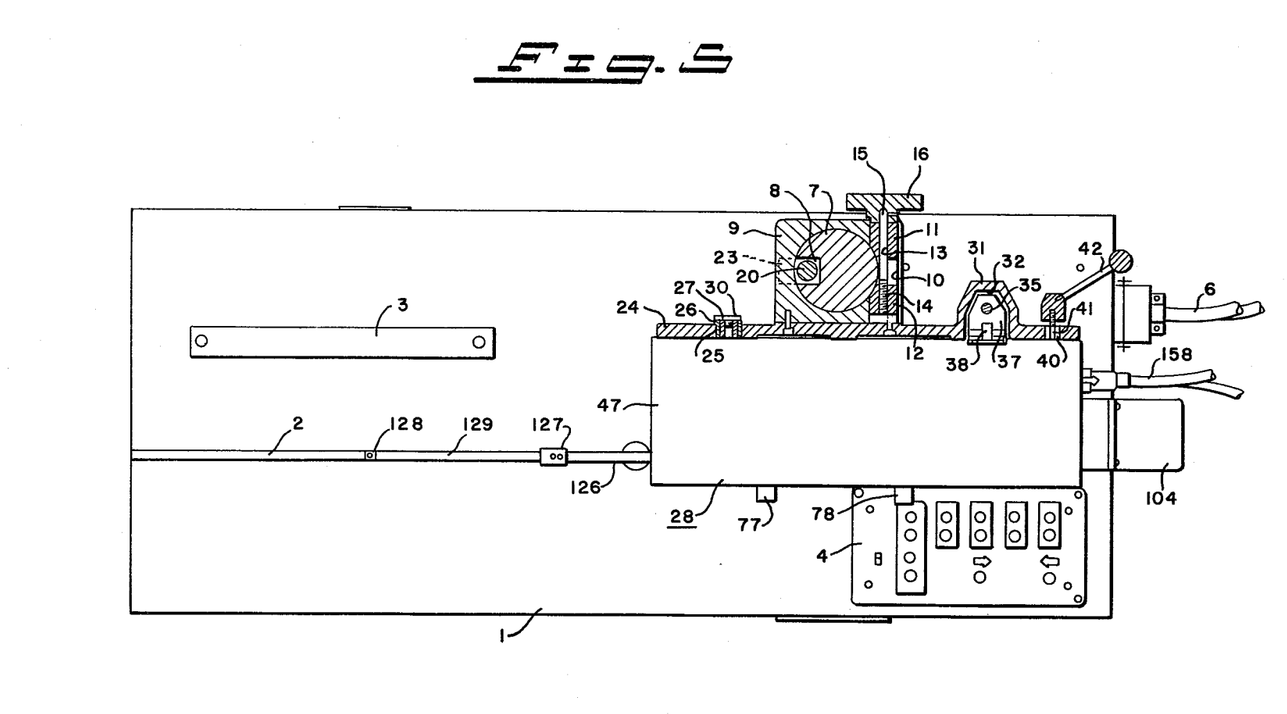
FIG. 5 is a sectional view of FIG. 4 taken along line 5—5.

Base 1 is provided at one side surface thereof with a support pole 7 being round in section. A square groove 8 is formed at one side surface of said support pole 7 along the axial thereof. Vertically and slidably coupled on said support pole 7 is a slider 9. As shown in FIG. 5, slider 9 is provided with a horizontal through-hole 10 through which part of the outer periphery of the support pole 7 is exposed. Movably contained within said through-hole 10 are a pair of clamp members 11 and 12. Clamp members 11 and 12 are clamped to the outer periphery of the support pole 7. One of the pair of clamp members 11 has a through-hole 13 and the other 12 has threaded hole 14. A threaded portion of a clamp screw 15 penetrates through said through-hole 13 and is threadably coupled into the threaded hole 14. Clamp screw 15 has a finger grip 16 adjacent clamp member 11. Finger grip 16 is rotated to change the distance between the clamps 11 and 12, such that the slider 9 can be fixed in a predetermined place on the support pole 7.

A head member 17 is threadably coupled to the upper end of the support pole 7 and a bearing member 18 is also threadably disposed on the square groove 8 at the lower portion of the support pole 7. Rotatably supported between said bearing 18 and a bearing 19 provided on the head member 17 is a threaded shaft 20. A handle 21 is solidly secured to the upper portion projecting from the bearing 19 of said threaded shaft 20, whereby the threaded shaft 20 is adapted to be rotated by the rotation of the handle 21. Additionally, a nut member 22 whose opposite sides are guided by the square groove 8 is threadably joined to adjacent to intermediate portion of the threaded shaft 20. Nut member 22 is also secured to the slider 9 through an intermediate member 23. With this arrangement, the nut member 22 and the slider 9 are guided by the square groove 8 so as to be vertically movable along the support pole 7.

A plate 24 for mounting the main body of the measuring apparatus is threadably coupled to one side surface of slider 9. The crosswise direction of said mounting plate 24 is disposed vertically, and the longitudinal direction thereof is disposed substantially horizontally. Provided adjacent the lower portion of one side of the mounting plate 24 is a shaft hole 25, through which is inserted a fulcrum shaft 27 via a bearing 26. One end of said fulcrum shaft 27 is solidly secured to a side plate 29 of the main body of the measuring apparatus, and the other end of the fulcrum shaft 27 is threadably coupled to a slip-off preventive bolt 30. The head portion of said bolt 30 has an outer diameter sufficient to abut against the side surface of said bearing 26, whereby the fulcrum shaft 27 is prevented from falling off the mounting plate 24 and the main body 28 of the measuring apparatus is rotatable about the fulcrum shaft 27.

Figure 4:
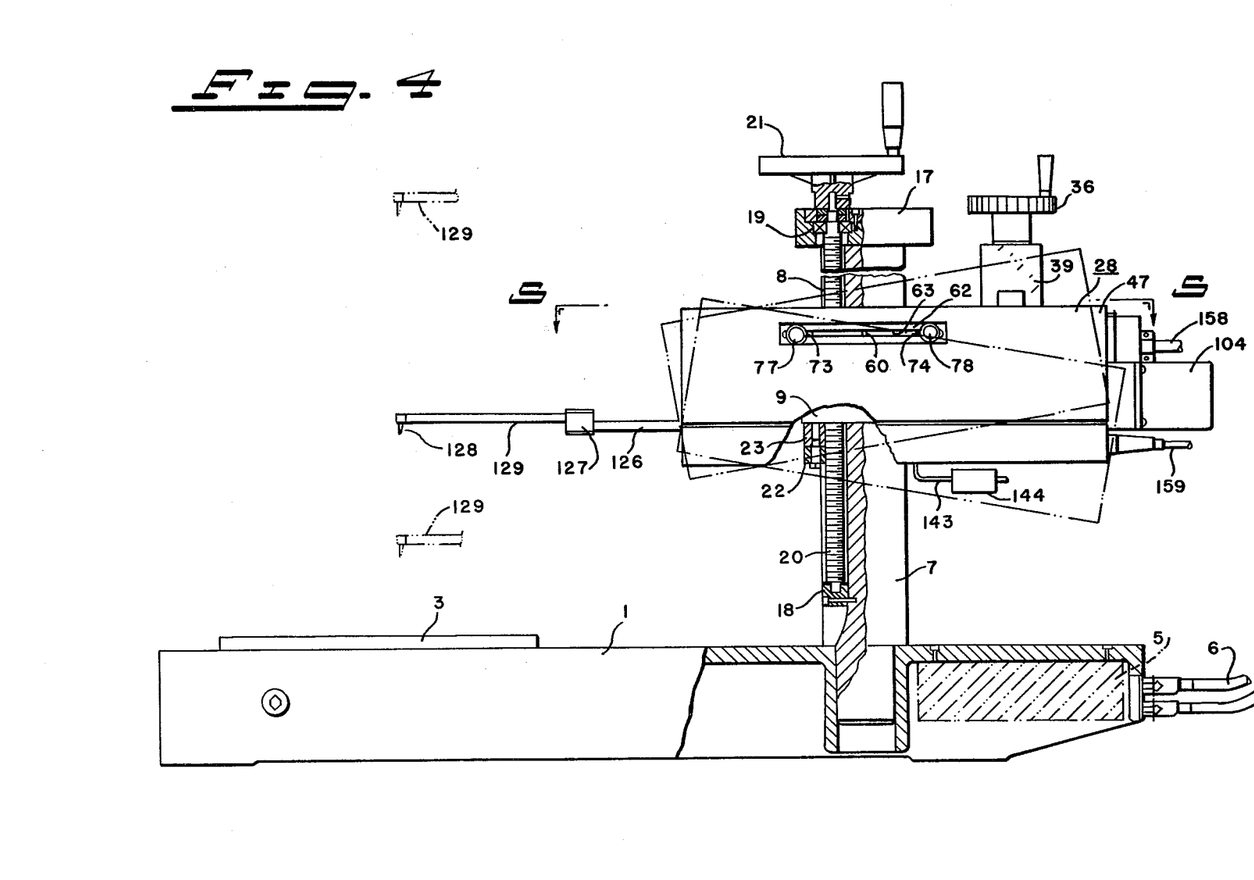
FIG. 4 is a general front view showing the device of the present invention with some aspects being shown in a cutaway manner.
Figures 6, 7:
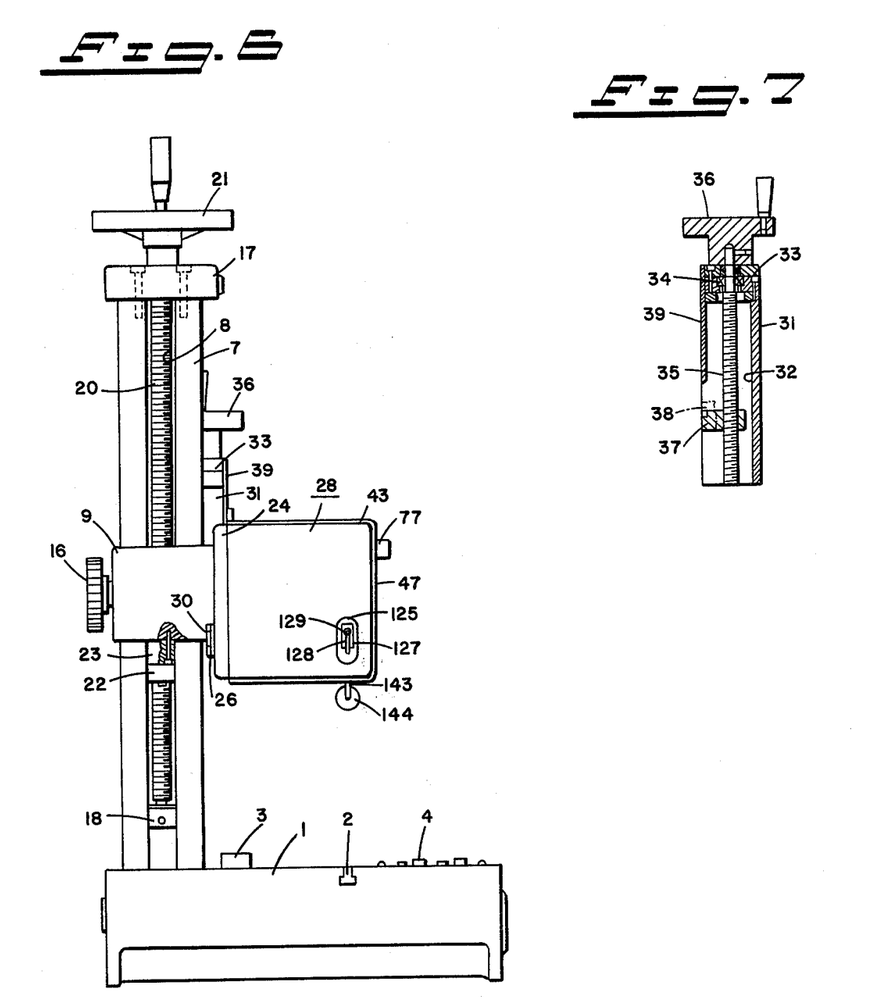
FIG. 6 is a left side view of the device of the present invention.
FIG. 7 is a sectional view of the mechanism used to adjust angle between some of the various elements of the device of the present invention.
Figure 9:
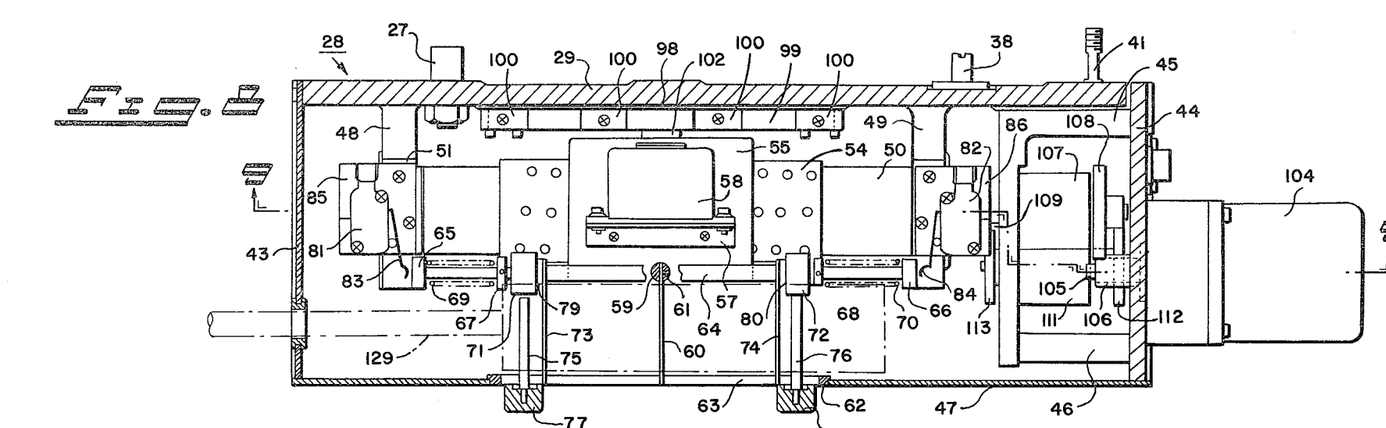
FIG. 9 is a sectional view taken along line 9—9 in FIG. 8 and showing many of the internal components of the device of the present invention.

Integrally formed on the other side of said mounting plate 24 is a ridge 31 projecting in the direction opposite said main body 28 of the measuring apparatus. The ridge 31 is provided therein with a groove 32. The upper end of said ridge 31 is projected upwardly of other portions of the mounting plate 24, and a bearing support member 33 is threadably coupled to said upper end. The upper portion of a threaded shaft 35 is for adjusting the angle and is rotatably supported by a bearing 34 mounted at the central portion of said bearing support member 33. More specifically, a handle 36 for adjusting the angle of body 28 is solidly secured to portion of the threaded shaft 35 projecting from the bearing 34, and the lower end of the threaded shaft 35 is extended along said groove 32 to the lower end of said groove 32 as is most clearly shown in FIG. 7. Additionally, a nut member 37 for adjusting the angle similar in section to said groove 32 and slightly smaller in size than said groove 32 is threadably coupled to the intermediate portion of the threaded shaft 35. The nut member 37 is adapted to be vertically moved in said groove 32 by the rotation of the threaded shaft 35 being guided by the groove 32. Furthermore, a stud 38 fixed on the side plate 29 of said main body 28 of the measuring apparatus abuts against the upper surface of said nut member 37, and is adapted to be vertically moved along with the vertical movement of the nut member 37. The vertical movement of said stud 38 is about the fulcrum shaft 27, whereby the main body 28 of the measuring apparatus can be adjusted in its angle across the limits indicated by the dashed lines in FIG. 4. In this situation, groove 32 and the nut member 37 each have a predetermined width in crosswise direction such that the movement of the stud 38 in the crosswise direction may not be hampered. Further, a dial plate 39 is solidly secured to the upper portion of said groove 32 on the opening side, so that the angle of inclination of the main body 28 of the measuring apparatus can be read as hereinafter described. An accurate groove 40 centered about an axial hole 25, into which said fulcrum shaft 27 is fitted, is formed on a side portion (shown on the right side of FIG. 5) of said mounting plate 24 other than the side portion thereof where the ridge 31 is mounted. A clamp shaft 41 fixed on the side plate 29 of the main body 28 of the measuring apparatus is inserted into and passes through said circularly arcuate groove 40. The forward end of clamp shaft 41 projects from said mounting plate 24 and internal threads formed on the base portion of a clamp lever 42 are threadably coupled to external threads formed on said projecting portion, whereby the internal threads of the clamp lever 42 and the external threads of the clamp shaft 41 are threadably tightened to fasten the main body 28 of the measuring apparatus to the mounting plate 24. This enables one to adjust the angle of body 28 by loosening lightening lever 42.

Next a description will be given of the arrangement of the main body 28 of the measuring apparatus with reference to FIGS. 8 to 12.

End plates 43 and 44 are disposed at opposite ends of said side plate 29, respectively. One of the end plates 43 is directly fixed on said end plate 29, and the other 44 is fixed through a spacer 46 on a clutch mounting bracket 45 solidly secured to the side plate 44. A cover 47 formed of a plate member being a "U" shape in section is mounted on the side plate 29 in a manner to cover openings of a "U" shaped structure formed of the side plate 29 and both end plates 43 and 44, i.e. the upper, and lower surfaces of the main body 28 of the measuring apparatus and a surface opposite the side plate 29, whereby the main body 28 of the measuring body is formed into a rectangular parallelepiped in its outer appearance.

The side plate 29 is provided at the portions relatively close to the opposite ends thereof in the casing with internally formed guide shaft support walls 48 and 49, respectively. A guide shaft 50 formed of a solid rod having a relatively large diameter is racked across said support walls 48 and 49. One end (shown at the left end in FIG. 9) of said guide shaft 50 is formed into a small diameter, said small diameter portion is inserted into a cylindrical seat 51 solidly secured to a support wall 48 by shrinkage fit or the like. The end face of the large diameter portion is brought into abutting contact with the inner end face of the cylindrical seat 51. Additionally, the end face of the large diameter portion of a plug member 52 for securing the guide shaft is brought into abutting contact with the outer end face of the cylindrical seat 51. The small diameter portion of said plug member 52 is inserted into the cylindrical seat 51. Further, said plug member 52 and the guide shaft 50 are solidly secured to each other by means of a plurality of bolts 53. With this arrangement, the guide shaft 50 is solidly secured to the support wall 48 through the cylindrical seat 51. Coupled onto the outer periphery of said guide shaft 50 through a ball bushing 54 is a high hardness cylindrical member 56 solidly secured to the central portion of a movable member 55. Solidly secured to the upper surface of said movable member 55 through an "L" shaped bracket 57 is an alarm buzzer 58. Additionally, a pointer securing member 59 is solidly secured to the central portion of one side of the upper surface of the movable member 55, and one end of a pointer 60 is fixed in a groove provided at the central portion of said securing member 59. The other end of said pointer 60 is extended to a portion of said cover 47 opposite the side plate 29, and inserted into a slot 63 provided in a pointer position sensing plate 62 solidly secured to said cover 47.

A sliding shaft 64 is positioned directly above the pointer securing member 59 fixed on the upper surface of said movable member 55. Opposite ends of said sliding shaft 64 are slidably supported by guide plates 65 and 66 fixed on the upper ends of said support walls 48 and 49, respectively. Solidly secured to portions of said sliding shaft 64 slightly inwardly of the opposite ends thereof, respectively, are spring receivers 67 and 68, and compression coil springs 69 and 70 are confined between said spring receivers 67 and 68 and said guide plates 65 and 66, respectively, whereby the sliding shaft 64 is stopped at a position where both springs 69 and 70 are balance in force. In addition, the springy forces can be set at 0 in the condition shown in FIG. 9.

Furthermore, limit pointer mounting members 71 and 72 are movably provided on said sliding shaft 64 inwardly of the spring receivers 67 and 68, respectively. One end of each of the limit pointers 73 and 74 is secured to each of said mounting members 71 and 72 and the other end of each of the limit pointer 73 and 74 is extended into the slot 63 of said sensing plate 62. Additionally, one threaded end of each of fixing screws 75 and 76 for fixing said mounting members 71 and 72 onto the sliding shaft 64 is threadably coupled into said mounting members 71 and 72, and the other end of each of the fixing screws 75 and 76 projects from the slot 63 of said sensing plate 62. Solidly secured to the projecting portions of said fixing screws 75 and 76 projecting from the slot 63 are finger grips 77 and 78, respectively. The finger grips 77 and 78 can be rotated so as to screw the fixing screws 75 and 76 into the limit pointer mounting members 71 and 72 or screw out therefrom, so that the mounting members 71 and 72 may be fixed at desired positions on the sliding shaft 64 or made movable.

Further, step portions 79 and 80 are provided at inner end portions of said mounting members 71 and 72, respectively, and said pointer securing member 59 may be brought into abutting contact with said step portions 79 and 80. With this arrangement, if the pointer securing member 59 moves along with the movement of the movable member 55, and the pointer securing member 59 abuts against the step portion 79 or 80 of the mounting members 71 or 72 and moves further, then the sliding shaft 64 is caused to move in the same direction as the movable member 55 against the resilient force of the compression coil springs 69 or 70. Working pieces 83 and 84 of limit switches 81 and 82 are provided in opposed relation to the end portions of said sliding shaft 64, respectively, and said limit switches 81 and 82 are mounted on the upper end portions of said support walls 48 and 49 through mounting plates 85 and 86, respectively. Said sliding shaft 64 abuts against the working pieces 83 and 84 to actuate said limit switches, thereby effecting the reversed rotation or stop of a driving motor for the movable member 55 which will be described hereinafter. A screw shaft 87 is threaded at the central portion thereof and is disposed under said guide shaft 50. Opposite ends of said screw shaft 87 are supported by bearings 90 and 91 incorporated in bearing boxes 88 and 89 provided at the lower end portions of said support walls 48 and 49. A sleeve nut 92 whose one end is slitted like a collect chuck is threadably coupled onto the threaded portion of said screw shaft 87. Threadably coupled onto the outer periphery of the slitted portion of said sleeve nut 92 is a clamp nut 93, thereby minimizing the backlash between said sleeve nut 92 and the screw shaft 87. Furthermore, the sleeve nut 92 is inserted into a throughhole 95 in a nut receiving seat 94 solidly secured to the undersurface of said movable member 55. Nut 92 is regulated in its rotation by a pin 96 extending over a flange portion of said sleeve nut 92 and the receiving seat 94. Further 92 is axially prevented from withdrawal by a stopper ring 97 which clamps the receiving seat 94 in cooperation with the flange portion of the sleeve nut 92.

A guide rail 99 is solidly secured to a smooth surface 98 being raised a step from the inner side surface of the lower portion of said side plate 29. The upper and lower surfaces of said guide rail 99 are finished in a manner to have high straightness, and pairs of guide rail correcting members 100 are provided in opposed relation to each other at opposite end portions of said upper and lower surfaces and a pair thereof at the central portion of the upper surface. Said correcting members 100 each comprise an adjusting screw 101 which is made to abut against the upper and lower surfaces of said guide rail, respectively. In this manner, the straightness of the guide rail can be corrected. Additionally, a spherical forward end portion 103 of a member 102 for preventing the movable member from rotating which is solidly secured to the lower surface of said movable member 55 is made to abut against the lower surface of the guide rail 99. With this arrangement, the movable member 55 can move without rotating under the guidance of the spherical portion 103 and the guide rail 99.

Figures 11, 12:
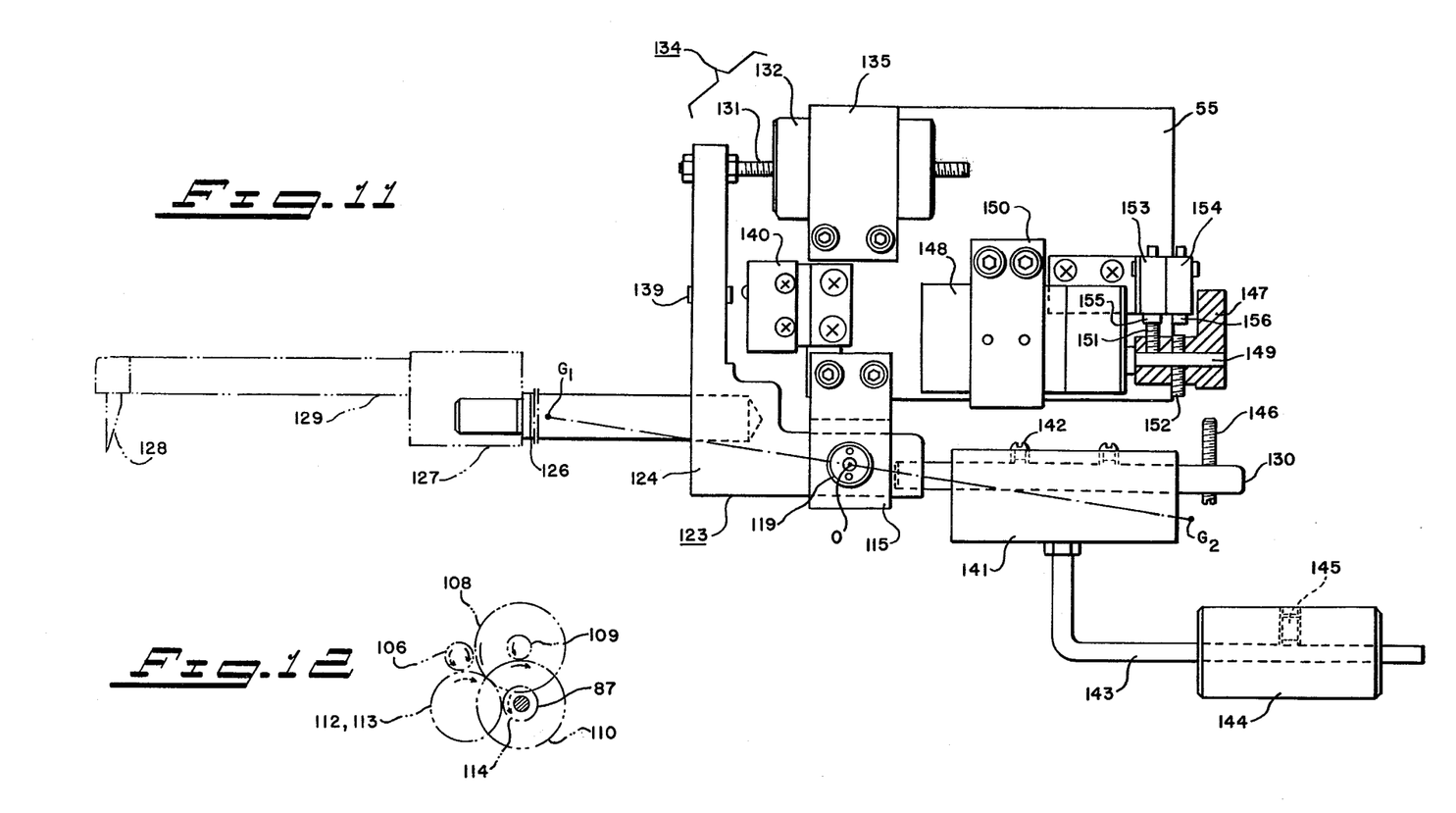
FIG. 11 is a front view showing the arm portion of the device of the present invention with certain parts being shown in a cutaway manner.
FIG. 12 is an explanatory view showing the relationship of the engagement of gears used in device of the present invention.

A driving motor 104 with a reducing gear for moving the movable member 55 is solidly secured to the outer side surface of the casing of said end plate 44, with its output shaft 105 being projected into the casing. An output shaft gear 106 is fixed on the output shaft 105 of said motor 104. Meshed with said output gear 106 is a first gear 108 mounted on the input side of a first electromagnetic clutch 107. A first pinion 109 integrally rotatable with the first gear 108 is mounted on the output side of the first electromagnetic clutch 10. Said first pinion 109 is meshed with a gear 110 of said screw shaft 87 fixed on a projecting portion projecting from the bearing 91 of said screw shaft 87. Furthermore, meshed with said output shaft gear 106 is a second gear 112 mounted on the input side of a second electromagnetic clutch 111, and a third gear 113 integrally rotatable with the second gear 112 is mounted on the output side of the second electromagnetic clutch 111. Said third gear 113 is made to have the same number of teeth as that of said second gear 112, and is meshed with a screw shaft pinion 114 fixed on the projecting portion projecting from the bearing 91 of said screw shaft 87. In this case, the gear ratios between said gears and pinions 106, 108, 109, 110, 112, 113 and 114 are those as shown in FIG. 12. For example, the train from the output shaft gear 106 through the first gear 108, first pinion 109 and to the screw shaft gear 110 has a reduction ratio about ten times as great as that of the train from the second gear 112 through the third gear 113 to the screw shaft pinion 114. In this manner, the R.P.M. of the driving motor 104 can be transmitted to the screw shaft 87 at a different reduction ratio.

Figure 10:
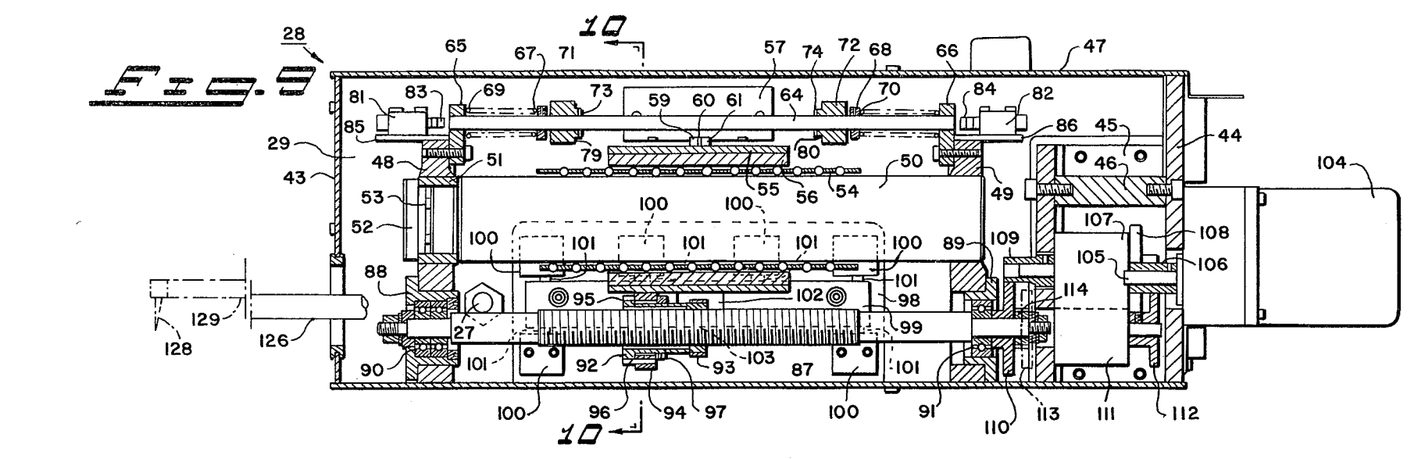
FIG. 10 is an enlarged sectional view taken along line 10—10 in FIG. 9 and showing greater detail of some of the internal components of the device of the present invention.

As shown in FIGS. 10 and 11, the upper end portion of an arm support member 115 is threadably secured to the lower portion at one side of a side surface of said movable member 55. A groove 116 is formed on the lower surface of said arm support member 115 in the axial direction of said guide shaft 50, and has a "U" shaped cross-section. Installed at positions in opposed relation to each other at opposite surfaces facing the groove 116 of said arm support member 115 are pivot ball bearings 117 and 118, respectively. An adjusting screw 119 partly projecting outwardly from the outer surface of the arm support member 115 abuts against the surface of one pivot ball bearings 117 opposite the groove 116, and a positioning screw 121 partly projecting from the interior of the arm support member 115 through a cap member 120 abuts against the surface of the other pivot ball bearing 118 opposite the groove 116. In said groove 116, a pivot 122 is pivoted at its opposite pointed portions across both pivot ball bearings 117 and 118 (Refer to FIG. 10). Said pivot 122 is solidly secured to an intermediate portion of an arm 123 so that said arm 123 can turn about the central axis of said pivot 122 as the fulcrum.

Said arm 123 is shown to have a "L" shape in FIG. 11 and principally comprises: a main body 124 to which said pivot 122 is secured; (i) a rod-like member 126 one end of which is fixed on the base portion of the vertical side of the main body 124 and the other end of which is extended through a bushing 125 having an oblong cross-section provided at the end plate of said casing; (ii) a stylus holding member 129 one end of which is connected to the forward end of said rod-like member 126 through a connecting member 127 and the other end of which has a stylus 128; and (iii) a weight support rod 130 having a round cross-section, one end of which is mounted at the rear end, i.e. the right end of said main body 124 as shown in FIG. 11.

A magnet core 131 is solidly secured at one end thereof to the upper end portion of the main body 124 of said magnet core 131 is fitted into a central throughhole 133 of a coil 132, whereby, said magnet core 131 and the coil 132 constitute a differential transformer 134 as the measuring means for measuring the value of movement (value of displacement) of the arm 123. The value of displacement in electric current determined by said differential transformer 134 is increased by an amplifier (not shown), and the shape thereof is recorded for measurement by a recorder. Additionally, coil 132 is supported in a through-hole 136 of a transformer support bracket 135 fixed on a side surface of said movable member 55. In this case, a slit 137 is formed at one side of the through-hole 136, and said slit 137 is clamped by a bolt 138 such that the coil 132 can be fixed on the transformer support bracket 135. Additionally, a screw 139 functioning as an actuating member penetrated the intermediate portion of said uprightly erected side and is screwed thereinto. A limit switch 140 for an alarm buzzer is provided in opposed relation to a projection of said screw 139 projecting inwardly from said uprightly erected side to the interior of the "L" shape. Said limit switch 140 is fixed on a side surface of said movable member 55. With this arrangement, in case the arm 123 rotates in the clockwise direction in FIG. 11 beyond a predetermined value, the screw 139 actuates the limit switch 140 so that said alarm buzzer can be sounded. A first weight 141 is fitted into the intermediate portion of said weight support rod 130, and said first weight 141 is fixed on the weight support rod 130 by means of a screw 142. Fixed at the center of the lower portion of said first weight 141 is the upper end of an "L" shaped support rod 143. A second weight 144 is fixed on a horizontal portion of said support rod 143 by means of a screw 145.

Screwed into the forward end portion of said weight support rod 130 is an arm screw 146 penetrating said support rod 130 and one end of which projects upwardly. The upper end of said arm screw 146 is in opposed relation to an eccentric cam 147 which is fixed on an output shaft 149 of an electric motor 148 for vertically moving the stylus. Said motor 148 is fixed on a side surface of said movable member 55 through a bracket 150. Additionally, said motor 148 is a D.C. motor with a reduction gear, and the voltage applied to said motor is adjustable by a voltage circuit not shown, whereby the rotational speed of the eccentric cam 147 is adjusted, so that the ascending and descending speeds of the stylus of the arm 123 can be arbitrarily selected.

Actuating screws 151 and 152 projecting in directions opposite to each other are screwed into the cylindrical portion of said eccentric cam 147 other than the cam portion thereof. Working pieces 155 and 156 of limit switches 153 and 154 are opposed to said actuating screws 151 and 152 within the radii of gyration of the forward end portions of said actuating screws 151 and 152 so that said working pieces 155 and 156 can be actuated by the gyration of the actuating screws 151 and 152. Additionally, said limit switches 153 and 154 are fixed on a side surface of the movable member 55 through an "L" shaped bracket 157.

Further, designated at $G_1$ in FIG. 11 is the gravity center of the whole weight applied to the arm 123 positioned on the arm 123 closer to the stylus 128 than the fulcrum 0. $G_2$ is the gravity center of the whole weight applied to the arm 123 closer to the first and second weights 141 and 144 than the fulcrum 0. Furthermore, a straight line connecting said gravity center $G_1$ to the gravity center $G_2$ is adapted to substantially pass through the fulcrum 0. In this case, to make said line pass through the fulcrum 0, the weights and positions of the members constituting the arm 123 and of the members to be mounted on said arm 123 are calculated in advance so that said line can pass through the fulcrum 0, and the arm 123 is made to take various angles of inclination. Therefore, fine adjustments are effected by changing the positions of the first and second weights 141 and 144 so that the measured force applied to the stylus in the conditions of various angles of inclination can be constant.

Additionally, designated at 158 and 159 are cords mounted on the main body 28 of the measuring apparatus for power source and for transmitting signals.

A description will be given of the operation of the present embodiment.

An object to be measured (not shown) is mounted on the base 1, positioned by the guide 3 for positioning, and fixed on the base 1 by means of a "T" shaped groove 2. Then, the main body 28 of the measuring apparatus is adjusted in its height and angle so that the measurements can be performed conveniently. The adjustment in height is achieved by the finger grip 16 operated to loosen the cramp screw 15 (see FIG. 5). In this condition, the handle 21 (FIG. 4) is rotated to turn the screw shaft 20 so as to vertically move the slider 9 by way of the nut member 22. Upon the completion of the adjustment in height, the finger grip 16 is operated again to rotate the clamp screw 15 for clamping the slider 9.

The adjustment in angle is achieved by loosening the clamp lever 42 to rotate the handle 36 whereby the main body 28 of the measuring apparatus is turned about the fulcrum shaft 27 by way of the nut member 37 for adjusting the angle and the stud 38. Thereafter, the clamp lever 42 is tightened again for clamping the body 28 in a selected position.

Upon the completion of the adjustments in position and angle of the main body 28 of the measuring apparatus as described above, the instrument panel 4 is operated. The motor 148 is used for vertically moving the stylus while the corner of the eccentric cam 147 is elevated, and the urging pressure applied to the arm screw 146 by said corner is released. In this case, the voltage applied to the motor 148 is decreased by suitably selecting the electric circuit to decrease the rotational speed thereof, whereby the release of the arm 123 is slowly effected by the eccentric cam 147. With this arrangement, the arm 123 causes the stylus 128 to abut against the object to be measured slowly at a measuring pressure predetermined by the difference between the moments applied to the gravity centers $G_1$ and $G_2$, whereby the initiation of measuring becomes possible. In this case, said motor 148 for vertically moving the stylus, when the corner of the eccentric cam 147 comes to the uppermost position, is automatically stopped and is maintained in this condition, i.e. the condition shown in FIG. 11. This is achieved because the actuating screw 151 abuts against the limit switch 153.

Next, the instrument panel 4 is operated to actuate the motor 104 for driving the movable member 55 and either the first clutch 107 or the second clutch 111. In this manner, the rotation of the motor 104 is transmitted to the screw shaft 87. In this case, the selection of the clutch is determined depending upon the surface and contour of the object to be measured. If the screw shaft 87 is rotated, then the movable member 55 and the sleeve nut 92 which has been prevented from rotating by the nut receiving seat 94, moves in the axial direction of the screw shaft 87. Along with the movement of said sleeve nut 92, the movable member 55, through said nut receiving seat 94, is guided by the guide shaft 50 and the guide rail 99 to smoothly move in the axial direction. In this case, the guide rail 99 and the spherical forward end portion 103 of the member 102 are in point-to-point contact to each other and the spherical forward end portion 103 is fixed on the member 102. Hence, the movable member 55 is moved without any rotation about member 50.

Along with the movement of the movable member 55, the arm 123 rotatably supported through the arm support member 115 by said movable member 55 is also moved. In this manner, the relative movement is effected between the object to be measured and the stylus 128 in slidable contact with each other. In this case, the stylus 128 is caused to abut against the outer surface of the object to be measured at a predetermined measuring pressure, and hence, the stylus 128 moves while tracing the uneven surface of the object to be measured and moving vertically. Said vertical movement of the stylus 128 is converted into a movement centered around the fulcrum 0 of the arm 123, which movement is measured by the differential transformer 134 functioning as the measuring means, so that the surface contour of the object to be measured can be measured.

During measuring of the object, if the stylus 128 is elevated over a predetermined value and the arm 123 is rotated in the clockwise direction over a predetermined angle, the screw 139 acts on the limit switch 140 to actuate the alarm buzzer 58 so that this condition can be sensed.

Thus, the measurement of the contour of the object to be measured is continued along with the movement of the movable member 55. The movable member 55 moves to one side, e.g. to the left in FIG. 8 with the result that the pointer securing member 59 abuts against the limit pointer mounting member 71. If the movable member 55 moves further, then the sliding shaft 64 moves leftwards against the resilient force of the compression coil spring 69. The left end of the sliding shaft 64 abuts against the working piece 83 of the limit switch 81 to thereby actuate switch 81. The operation of switch 81 rotates the motor in the reverse direction, with the result that the movable member 55 is moved to the right to actuate the limit switch 82 through the limit pointer mounting member 72 and the sliding shaft 64 in the same manner as described above. If said switch 82 is actuated, then the motor 104 is stopped in operation and the motor 148 for vertically moving the stylus is started. The start of said motor 148 for vertically moving the stylus moves the corner of the eccentric cam 147 downwards, urges the arm screw 146, and rotates the arm 123 in the clockwise direction, whereby the stylus is separated from the object to be measured. In this case, the voltage applied to the motor 148 is increased by the suitable selection of the electric circuit to increase the rotational speed of the motor to thereby quicken the elevation of the stylus. If the corner of the eccentric cam 147 comes to the lowermost position as described above, then the actuating screw 152 actuates the working piece 156 of the limit switch 154 to stop the motor 148 for vertically moving the stylus.

Upon completion of the measurement within the predetermined limits as described above, the position of the main body 28 of the measuring apparatus, the position of the object to be measured and the like are changed again to continue the further measurement. In this case, even if the angle of inclination of the main body 28 of the measuring apparatus is changed, the measuring force of the stylus 128 is not changed because the line connecting the gravity center G1 to the gravity center G2 is made to substantially pass through the fulcrum 0. Additionally, the movement of the movable member 55 can be verified by the inspection of the movement of the pointer 60 through the slot 63 of the pointer position sensing plate 62. In this case, to change the limits of movement of the movable member 55, the finger grips 77 and 78 are operated to loosen the fixing screws 75 and 76 whereby the positions whereof the limit pointer mounting members 71 and 72 are fixed to the sliding screw 64 are changed, thereby enabling one to easily change the position.

As has been described above, in the present embodiment, since the gravity centers G1 and G2 and the fulcrum 0 are substantially arranged on a straight line, such an advantage can be offered that a stable measuring pressure can be constantly applied to the stylus 128 irrespective of the angle at which the main body 28 of the measuring apparatus is mounted, i.e. the angle of inclination of the arm 123.

Additionally, since the weight for adjusting the balance of the arm 123 is divided into two weights including first and second weights 141 and 144, each of which is movable separately of each other, the adjustment of the balance can be effected very easily.

Further, since no solenoid is used as the clamp for the arm 123 as in conventional practice; rather, the eccentric cam 147 is used, the release of the arm 123 can be effected slowly. In this manner, little possibility of damaging the stylus 128. Furthermore, a D.C. motor is used as the motor 148, and hence, the voltage can be increased by the suitable selection of the electric circuit, so that the elevation of the stylus 128 can be effected quickly, thus enabling to shorten the working hours.

Since the movable member 55 is arranged to be guided through the ball bush 54 by the guide shaft 50, the construction of said movable member can be simplified and strengthened. Moreover, there is the advantage of decreased frictional resistance. Furthermore, since the movable member 55 is prevented from rotating by the spherical forward end portion 103 of the rotation preventing member 102 and the guide rail 99, possible errors in measurement which would otherwise result from the rotation of the movable member 55 can be prevented. In this case, rollers and the like are not used at the contact point between the guide rail 99 and the rotation preventing member 102, and hence, there is little turning because of looseness of rollers. Furthermore, the point-to-point contact brings about decreased sliding resistance.

Since the motor 104 for driving the movable member 55 is provided at the outer surface of the end plate 44 thereof with a heat generating portion, the heat generated by the motor 104 does not affect the interior of the casing, and consequently, errors in measurement which would otherwise be caused by elevated temperature of the differential transformer 134 are eliminated.

Since no leaf spring having a cross shape in section is used as the fulcrum for rotating the arm 123 as in conventional practice but pivot type bearings are used, the rotation is smoothly performed, and the accuracy in measurement improved. Moreover, said bearings can be easily repaired.

Further, if the arm 123 rotates over a predetermined angle, then alarming means including the screw 139, the limit switch 140 and the alarm buzzer 58 can be used to protect the arm. Hence, an unexpected deforming stress can be prevented from being applied to the apparatus.

Since two speed systems are adapted for driving the screw shaft 87 by the driving motor 104, a suitable measuring speed in accordance with the contour and properties of the object to be measured can be selected. Moreover, rapid return operation can be effected in returning the arm 123.

The progress of movement of the movable member 55 can be inspected at a glance through the movement of the pointer 60, and working time administration can be effected readily. Additionally, the setting of limits of movement can be easily performed by the operation of the finger grips 77 and 78.

Finally, suitable changes in design can be made. For example, the limit switch 81 shown at the left can be converted from the switch for reversing the rotation of the motor 104 into a switch for stopping the rotation; and the motor 148 for vertically moving the stylus can be started by the operation of the limit switch 82 shown at the right or by a switch other than said switch 82. Accordingly, it should be understood, that there is no intention to limit construction in the various portions to the above-described embodiment; the invention is to cover all modifications, alternate constructions and equivalents falling within the scope of achieveing the objects of the invention.

We claim:

1. A measuring device comprising:
   (a) a base for positioning an object to be measured; and
   (b) a measuring apparatus joined to said base, said measuring apparatus having an arm member divided into a first and second portion by a fulcrum, said first portion having the center of gravity adjacent a first end thereof farthest from the fulcrum, said second portion having weight means provided thereon, said weight applying a weight to the second portion such that said second portion has the center of gravity adjacent a second end thereof farthest from said fulcrum, and said fulcrum thereinbetween said first and second centers of gravity and wherein said first and second centers of gravity and the fulcrum lie in a common line.

2. A measuring device according to claim 1 wherein said measuring apparatus is movable mounted on an upwardly extending member joined to said base.

3. A measuring device according to claim 1 wherein said arm member includes a stylus coupled thereto adjacent said end of said first portion and a weight support rod coupled to said end said second portion and supporting said weight means.

4. A measuring device according to claim 1 wherein said arm member comprises a section having a generally L-shaped configuration, a rod-like member having a stylus holding member joined to said section and extending in a first direction, said first center of gravity located between said section and said rod-like member, and a weight support rod joined to said section and extending in a direction opposite to said rod-like member, said second center of gravity located between said section and said weight support rod.

5. A measuring device according to claim 1 wherein said arm member is joined to a selectively movable member in said measuring apparatus.

6. A measuring device according to claim 5 wherein said selectively movable member includes means for moving said arm member in a generally horizontal direction.

7. A measuring device according to claim 5 wherein said movable member comprises a generally cylindrical member coupled to a gear member such that upon activation of said gear member, said movable member moves said arm member in a generally vertical direction.

8. A measuring device according to claim 1 wherein said apparatus includes means for moving said arm member in a predetermined direction.

9. A measuring device comprising:
   (a) a base for positioning an object to be measured;
   (b) upwardly extending mounting means joined to said base; and
   (c) a measuring apparatus joined to said mounting means such that said apparatus can be moved relative to said base, said apparatus comprising a main body with a movable member disposed therein configured to be moved from one end of said body to the other, said movable member comprising a cylindrically shaped member circumferentially disposed about a fixed shaft, and an arm member rotatably joined to said movable member forming a fulcrum therewith said arm member comprising a stylus mounted on a rod-like member at one end thereof and a weight support member at the other end thereof, said arm member configured such that a first center of gravity is formed between said fulcrum and said stylus and a second center of gravity is formed adjacent said weight support member whereby said fulcrum is intermediate said first and second centers of gravity and said centers of gravity and fulcrum lie in a common line.

10. A measuring device according to claim 9 wherein said movable member is configured to move said arm member in a generally horizontal direction.

11. A measuring device according to claim 9 wherein said movable member is coupled to a gear member for selectively moving said movable member.

12. A measuring device according to claim 11 wherein said gear member is driven by a motor means.

13. A measuring device according to claim 9 wherein said main body includes switch means configured to selectively engage said arm member for regulating the movement of said arm member.

14. A measuring device according to claim 9 wherein rotatable cam means is disposed on said main body adjacent said weight support member such that upon activation of said cam means, said weight support member is selectively engaged thereby causing said arm member to move in a generally vertical direction.

15. A measuring device according to claim 9 wherein said arm member is rotatably joined to an arm support member by bearing means, and said arm support member is fixedly joined to said movable member, said fulcrum being formed between said arm member and said arm support member.

16. A measuring device according to claim 9 including means for limiting the movement of said cylindrical member on said fixed shaft.

17. A measuring device according to claim 16 wherein said limiting means is activated when said cylindrical member moves a predetermined distance along said fixed shaft.

* * * * *

UNITED STATES PATENT AND TRADEMARK OFFICE
CERTIFICATE OF CORRECTION

PATENT NO. : 4,265,022
DATED : May 5, 1981
INVENTOR(S) : Hironori Noguchi; Kenji Sakuma It is certified that error appears in the above—identified patent and that said Letters Patent is hereby corrected as shown below:

```
After [22], add --[30]   Foreign Application Priority Data
   Feb. 22, 1978 [JP]    Japan ........ 53-21,633[U]--.
```

Signed and Sealed this

Twentieth Day of October 1981

[SEAL]

Attest:

GERALD J. MOSSINGHOFF

Attesting Officer    Commissioner of Patents and Trademarks